(12) United States Patent
Sikarwar et al.

(10) Patent No.: US 11,971,775 B2
(45) Date of Patent: Apr. 30, 2024

(54) PREDICTING AN UNSUCCESSFUL ERROR CORRECTION CODE CONDITION USING A DYNAMIC READ THRESHOLD TABLE

(71) Applicant: Western Digital Technologies, Inc., San Jose, CA (US)

(72) Inventors: Yogendra Singh Sikarwar, Bengaluru (IN); Prateek Kumar TR, Bengaluru (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/946,537

(22) Filed: Sep. 16, 2022

(65) Prior Publication Data

US 2024/0095115 A1 Mar. 21, 2024

(51) Int. Cl.
*G06F 11/00* (2006.01)
*G06F 11/07* (2006.01)
*G06F 11/30* (2006.01)

(52) U.S. Cl.
CPC ........ *G06F 11/0772* (2013.01); *G06F 11/076* (2013.01); *G06F 11/3037* (2013.01)

(58) Field of Classification Search
CPC .......................... G06F 11/076; G06F 11/3037
See application file for complete search history.

*Primary Examiner* — Amine Riad
(74) *Attorney, Agent, or Firm* — Armstrong Teasdale LLP (57) ABSTRACT

Various processes for efficiently and effectively determining or predicting whether data stored in a non-volatile storage device is unreadable and/or unrecoverable during a read-retry process. To make the determination, different dynamic read threshold (DRT) entries of a dynamic read threshold (DRT) table are applied, in parallel, across different planes of the non-volatile storage device to determine whether the data is unreadable and/or unrecoverable.

20 Claims, 6 Drawing Sheets

PREDICTING AN UNSUCCESSFUL ERROR CORRECTION CODE CONDITION USING A DYNAMIC READ THRESHOLD TABLE

BACKGROUND

Data that is stored in a non-volatile storage device (e.g., a NAND memory device) is read by identifying a voltage level of each cell. If the voltage level is above a certain threshold voltage, a determination is made that the data stored in that cell is associated with a specific charge state. The charge state is then used to determine the data that is stored in that particular cell.

Over time, data stored in the non-volatile storage device may become corrupted or otherwise be unreadable. For example, repeated read operations, write operations, and erase operations performed on the non-volatile storage device may reduce the reliability of the non-volatile storage device. As a result, the amount of charge stored in some of the cells can change. This decreases or increases the voltage level at which the cells operate. If the change in voltage is too great, the data stored in the cell may be read incorrectly or otherwise cause a requested read operation to fail. In such cases, a read-retry process is typically used in an attempt to read the data.

In a read-retry process, the requested read operation is performed an additional time using different voltage thresholds that are stored in a dynamic read threshold (DRT) table. For example, a first set of voltage thresholds may be applied across each plane of the non-volatile storage device in which the requested data is stored. If the first set of voltage thresholds fails to enable the data to be read, a second set of voltage thresholds is applied across each plane of the non-volatile storage device. This process repeats until the data is read or until all entries in the DRT table have been exhausted.

In some cases, the data is not recoverable. However, the non-volatile storage device may still be required to exhaust all of the entries in the DRT table before this determination is made. Exhausting all entries in the DRT table is a time consuming process and may result in a timeout condition.

Accordingly, it would be advantageous to reduce the amount of time required to exhaust all of the entries in a DRT table in order to quickly determine whether data stored in a non-volatile storage device is unreadable and/or unrecoverable.

SUMMARY

The present application describes a system and method to determine or otherwise predict whether data stored in a non-volatile storge device (e.g., a NAND memory device) is unreadable and/or unrecoverable. In order to make this determination, the system described herein uses a read-retry process in which multiple dynamic read threshold (DRT) entries of a dynamic read threshold (DRT) table are applied across the various planes of the non-volatile storage device to determine whether an unsuccessful error correction code (UECC) condition exists.

However, in contrast to traditional read-retry processes in which the same DRT entry is applied across each of the different planes of the memory device, the read-retry process of the present disclosure applies a first DRT entry across a first plane of the non-volatile storage device and applies a second DRT entry across a second plane of the non-volatile storage device. In some examples, the first DRT entry is applied across the first plane of the non-volatile storage device and the second DRT entry is applied to the second plane of the non-volatile storage device simultaneously or substantially simultaneously.

This process may repeat with all DRT entries in the DRT table until all of the entries in DRT table have been applied to the non-volatile storage device. As two different DRT entries are applied to the different planes of the non-volatile storage device simultaneously or substantially simultaneously, the amount of time required to determine and report a UECC condition is effectively cut in half when compared to traditional methods. For example, for one memory die having two planes, the operations described herein reduces the time it takes to report a UECC condition by fifty percent. In a memory die having n planes, and/or for n planes spread across multiple memory dies, the operations described herein reduces the time it takes to report a UECC condition by: current time/n (where current time is an amount of time it takes to report a UECC condition using traditional read-retry methods).

Accordingly, the present application describes a method that includes receiving an indication that a read operation, requested by a host device, has failed. In an example, the read operation is a request for data stored by a data storage device. Based on receiving the indication, a dynamic read threshold table is accessed. In an example, the dynamic read threshold table stores a plurality of dynamic read threshold entries for reading the data stored by the data storage device. When the dynamic read threshold table is accessed, a first dynamic read threshold entry of the plurality of dynamic read threshold entries is applied to each page associated with a memory block on a first plane of a memory die associated with the data storage device. Likewise, a second dynamic read threshold entry of the plurality of dynamic read threshold entries is applied to each page associated with a memory block on a second plane of the memory die associated with the data storage device. A determination is then made as to whether at least one of the first dynamic read threshold entry of the plurality of dynamic read threshold entries and the second dynamic read threshold entry of the plurality of dynamic read threshold entries is successful in reading the data associated with the read operation.

The present application also describes a data storage device. In an example, the data storage device includes a controller and a memory communicatively coupled to the controller. In an example, the memory stores instructions that, when executed by the controller, perform various operations. For example, the controller may determine that a read operation requesting data stored by the data storage device is unsuccessful. Based on that determination, the controller may apply a first dynamic read threshold entry associated with a dynamic read threshold table to across a first plane of a memory die of the data storage device on which the data is stored. Likewise the controller may apply a second dynamic read threshold entry associated with the dynamic read threshold table across a second plane of the memory die of the data storage device on which the data is stored. The controller may also determine whether at least one of the first dynamic read threshold entry and the second dynamic read threshold entry is successful in reading the data associated with the read operation.

Also described is a data storage device. The data storage device includes a non-volatile storage device comprising a plurality of memory dies. In an example, each memory die of the plurality of memory dies has a first plane and a second plane. The data storage device also includes means for determining that a requested read operation associated with at least one memory die of the plurality of memory dies is unsuccessful. The data storage device also includes means for applying a first dynamic read threshold entry associated with a dynamic read threshold table across the first plane of the at least one memory die and means for applying a second dynamic read threshold entry associated with the dynamic read threshold table across the second plane of the at least one memory die based on determining that the requested read operation is unsuccessful. The data storage device also includes means for determining whether at least one of the first dynamic read threshold entry and the second dynamic read threshold entry is successful in reading data requested by the read operation and stored by the at least one memory die.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. The following detailed description is therefore not to be taken in a limiting sense, and the scope of the present disclosure is defined by the appended claims and their equivalents.

The present application relates to read-retry and the order in which asynchronous independent plane read (AIPR) based dynamic read threshold (DRT) prediction for unsuccessful error correction code (UECC) is performed in order to avoid timeout conditions for various memory devices. In a read-retry process, if an initial read of a particular page (or pages) is unsuccessful, a second read is performed using a different value(s). The different value(s), referred to herein as a DRT entry, may be stored in a DRT table. In examples, each DRT entry in the DRT table may consist of different voltage thresholds or a set of voltage thresholds.

However, unlike a traditional read-retry process in which the same DRT entry is applied across each of the different planes of the memory device, the present application describes a read-retry process in which a first DRT entry is applied across a first plane of the memory device and a second DRT entry is applied across a second plane of the memory device. In examples, the first DRT entry and the second DRT entry are applied across the various planes, blocks, pages and/or sub-pages in a predetermined order.

For example, the first DRT entry may be applied to a lower-page, a middle page, an upper page and a top page of a particular block on the first plane of the memory device on which the data is stored. Likewise, the second DRT entry may be applied to a lower-page, a middle page, an upper page and a top page of a particular block on the second plane of the memory device on which the data is stored. In some examples, the second DRT entry and the first DRT entry are applied to the various planes of the memory device synchronously, simultaneously or substantially simultaneously. In other examples, the various DRT entries may be applied to the various planes, blocks, pages and/or sub-pages, of the memory device asynchronously.

This process may repeat with all DRT entries in the DRT table until all of the entries in DRT table have been applied to the various planes of the memory device. As two different DRT entries are applied to the different planes of the memory device in parallel, the amount of time required to determine and report a UECC condition is effectively cut in half when compared to traditional read-retry methods. For example, if a memory dies has two planes, the process may reduce the time it takes to report a UECC condition by fifty percent. However, if a memory die has n planes, and/or for n planes that are spread across multiple memory dies, the process may reduce the time it takes to report a UECC condition by: current time/n (where current time is an amount of time it takes to report a UECC condition using traditional read-retry methods).

Due to the time saved in determining the UECC condition, timeout conditions may be avoided. Additionally, the time saved allows other operations (e.g., garbage collection, wear-leveling, parity checks) that were blocked by the read-reties, to be performed sooner.

For example, some memory devices may allow a specified amount of time for a read-retry process (e.g., 250 ms). If the data is not read during this time period, the request times out. However, the aspects of the present disclosure enable the read-retry process to be completed in approximately half the allotted time (e.g., 125 ms). During the remaining allotted time, the various operations described above may be performed.

Accordingly, the present application describes many technical benefits including reducing the amount of time it takes to report a UECC condition of a memory device, enabling memory devices to avoid timeout conditions, and enabling background features and/or foreground operations to commence sooner when compared to traditional read-retry processes.

These and other examples will be described in more detail with respect to FIG. 1—FIG. 5.

Figure 1:
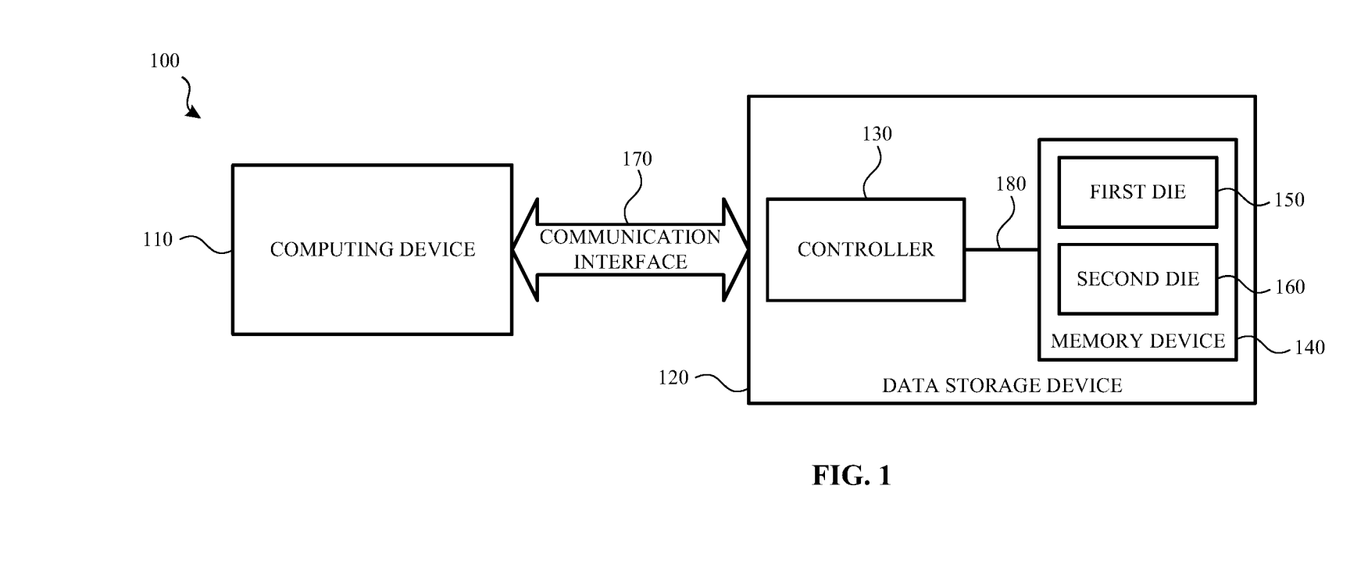
FIG. 1 illustrates an example data storage system that may use a dynamic read threshold (DRT) table to predict an unsuccessful error correction code (UECC) condition of a memory device according to an example.

FIG. 1 illustrates an example data storage system 100 that may use a dynamic read threshold (DRT) table to predict an unsuccessful error correction code (UECC) condition of a memory device according to an example. The data storage system 100 may include a computing device 110 and a data storage device 120. The data storage device 120 may be part of or otherwise integrated with the computing device 110. In another example, the data storage device 120 may be separate from, or otherwise external to, the computing device 110. The data storage device 120 may be any type of data storage device, drive, module, component, and/or system. For example, the data storage device 120 may be a hybrid hard drive, a solid-state drive, a hard disk drive, and so on. In one example, the data storage device 120 may have limited resources (e.g., RAM and/or storage blocks) based on, for example, an end product that utilizes the data storage device 120 and/or the data storage system 100.

The data storage device 120 may include a controller 130. In an example, the controller 130 includes control circuitry, processing circuitry, software, firmware, or a combination thereof. For example, the controller 130 may include one or more processors, memory devices, data and or power transmission channels/paths, boards, and the like in order to perform the various functions and features described herein.

The controller 130 may be implemented as a system-on-a-chip (SoC), a field-programmable gate array (FPGA), an application-specific integrated circuit (ASIC), and the like. In another example, the controller 130 (or various components of the controller 130) may be mounted on a printed circuit board (PCB). The controller 130 may be configured to receive and/or send various commands. For example, the controller 130 may receive, execute and/or send various commands (e.g., read, write, and/or erase commands) in order to perform aspects of the various examples described herein. The controller 130 may also be configured to execute a read-retry process in which different DRT entries from a DRT table are used to decode data stored by a memory device 140.

The data storage device 120 may also include a memory device 140 (e.g. volatile and/or non-volatile memory). The memory device 140 (and/or portions of the memory device 140) may also be referred to as a storage medium. The memory device 140 includes a number of storage elements. In an example, each storage element is a chip or a memory die that is used to store data.

In the example shown, the memory device 140 includes a first memory die 150 and a second memory die 160. In an example, the first memory die 150 and the second memory die 160 include non-volatile memory elements such as, for example, NAND flash memory elements and/or NOR flash memory elements. Although two memory dies are shown, the memory device 140 may include any number of storage elements. For example, the storage elements may take the form of solid-state memory such as, for example, 2D NAND, 3D NAND memory, multi-level cell memory, triple level cell memory, quad-level cell memory, penta-level cell memory or any combination thereof.

In an example, each of the first die 150 and the second die 160 may include two more planes. Each plane may include N blocks (where N is greater than 1). Further, each block may include one or more pages and each of the one or more pages may be further divided into one or more sub-pages (e.g., lower page, middle page, upper page, top page).

The controller 130 may communicate with the computing device 110 via a communication interface 170. The communication interface 170 may include hardware such as, for example, wires, pins, traces, connectors, software, firmware, or a combination thereof. Example communication interfaces 170 include a peripheral component interconnect express (PCIe) bus, a serial AT attachment (SATA) bus, and a non-volatile memory express (NVMe) bus.

The communication interface 170 is used to transmit various commands between the computing device 110 and the controller 130. The commands may include data access commands, data storage commands and the like. For example, the controller 130 may receive commands from the computing device 110 via the communication interface 170 and execute the commands on the memory device 140.

The controller 130 may be coupled to the memory device 140 via an interface 180 (e.g., one or more lines, pins, wires, traces). The interface 180 may be used to convey commands, data, metadata, error correction information and/or other information to the memory device 140. Additionally, connections 180 may include read and write circuitry, including circuitry capable of providing read signals to the memory device 140 (e.g., read threshold voltages for NAND-type memory). In an example, each channel of the interface 180 may be coupled to different portions of the memory device 140.

In some examples, the controller 130 may include or otherwise have access to an error control system that identifies and/or limits the number of uncorrectable errors introduced into data during writes and/or reads to/from the memory device 140. The error control system may also be used to determine the presence of unsuccessful error correction code (UECC) conditions that are present in the data storage device 120.

In examples, the error control system is executed in software by one or more processors associated with the controller 130 and/or the computing device 110. In other examples, the error control system may be implemented by special purpose circuitry to perform data encoding and decoding functions. In such examples, the error control system may include an encoder and a decoder. In some examples, the encoder encodes data by applying an error control code to produce a codeword. The codeword may be stored by the data storage device 120.

In some examples, when encoded data (e.g., one or more codewords) is read from the data storage device 120, the decoder applies a decoding process to the encoded data to recover the data. In an example, the decoder may also attempt to correct errors in recovered data within the error correcting capability of error control code associated with, or otherwise available to, the decoder. In an example, various error control codes have different error detection and correction capacities and particular codes may be selected for various applications.

The controller 130 may also perform various sensing operations or read operations. As indicated above, each of the first die 150 and the second die 160 may include two more planes and each plane may include N blocks. The blocks are divided into pages and/or sub-pages. In some examples, the controller 130 may initiate one or more read operations. The read operations may be performed on each plane of each memory die independently. Thus, the read operations described herein may be referred to as independent plane reads (IPR). Additionally, the read operations may be performed in parallel, synchronously, simultaneously, substantially simultaneously and/or asynchronously.

In an example, a read operation is initiated when the computing device 110 sends one or more read requests (e.g., via communication interface 170) to the controller 130. The read requests include a request for data stored on one or more planes of the memory device 140.

Upon receiving the read request, the controller 130 may determine the physical location of the data associated with the read request in the memory device 140. For example, the controller 130 may determine the addresses of the requested data at specific planes of a particular storage element (e.g., first die 150 or second die 160).

In an example, the controller 130 may be configured to read data from one or more cells in one or more planes of the memory device 140. For example, the memory device 140 may include a sense amplifier circuit coupled to a bitline of a memory array. The bitline may also be coupled to an associated memory cell of a particular plane.

During a read operation (or a portion of the read operation), electrical current may be transmitted through the memory cell to facilitate a sensing operation by the sense amplifier circuit to read data from the memory cell. For example, the sense amplifier circuit may be configured to sense the amount of current being drawn through the bitline to the memory cell to identify a state of the memory cell (e.g., on-cell or off-cell), and in turn, identify a data bit having a certain logic level (e.g., logic 0 level or a logic 1 level) stored at the memory cell.

As data is received, the controller 130 may provide the raw read data (e.g., comprising one or more codewords) to the decoder. If the decoding is successful, the decoded data is provided to the computing device 110. However, if the decoding is not successful, the controller 130 may initiate a read-retry process such as described above. The read-retry process may continue until a UECC condition is determined.

Figure 2A:
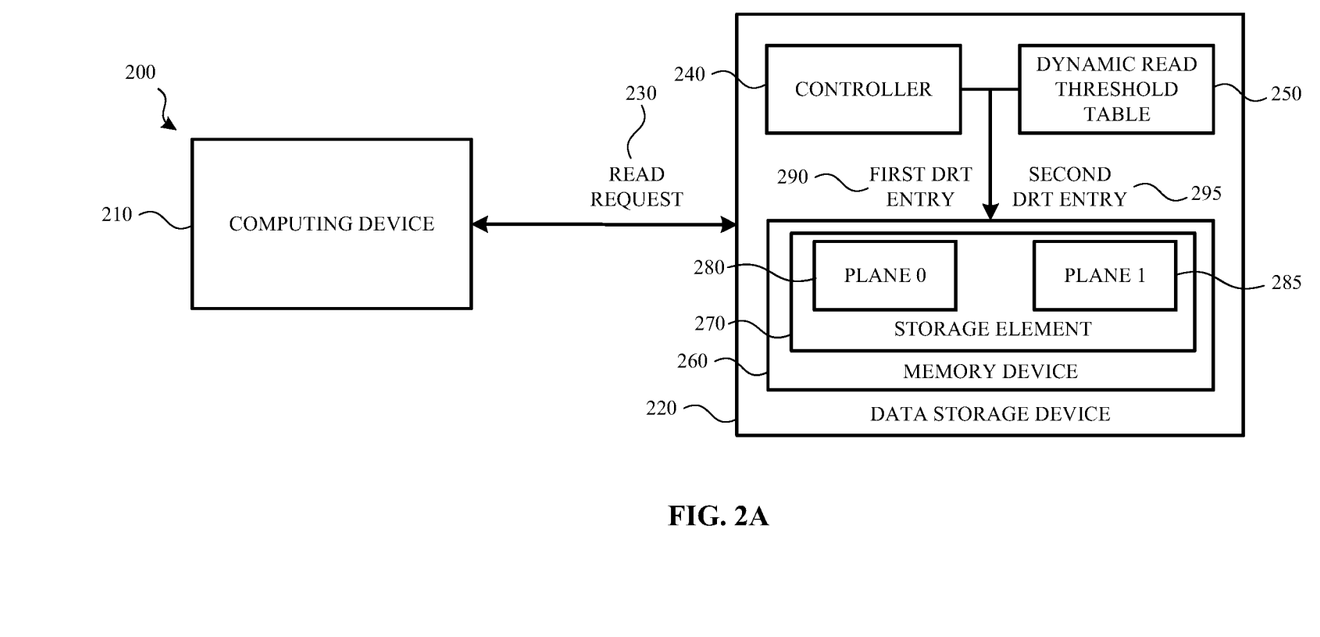
FIG. 2A illustrates an example data storage system submitting a read request to a data storage device according to an example.

FIG. 2A illustrates an example data storage system 200 that may be used to significantly reduce an amount of time required to determine or predict a UECC condition of a memory device according to an example.

In an example, the data storage system 200 may be similar to the data storage system 100 shown and described with respect to FIG. 1. For example, the data storage system 200 may include a computing device 210 communicatively coupled to a data storage device 220. The computing device 210 may be similar to the computing device 110 shown and described with respect to FIG. 1. Likewise, the data storage device 220 may be similar to the data storage device 120 shown and described with respect to FIG. 1.

For example, the data storage device 220 may include a controller 240 and a memory device 260. The memory device 260 may be similar to the memory device 140 shown and described with respect to FIG. 1. In some examples, the memory device 260 may include a storage element 270 (e.g., a memory die). Although a single storage element 270 is shown and described, the memory device 260 may include multiple storage elements 270.

The storage element 270 may include two planes. For example and as shown in FIG. 2A, the storage element 270 includes Plane 0 280 and Plane 1 285. Although two planes are shown, a storage element 270 may include any number of planes. Additionally, while the examples described herein relate to the storage element 270 and its respective planes (e.g., Plane 0 280 and Plane 1 285), the processes described herein may be applied across different planes on different storage elements. For example, one plane (e.g., Plane 0 280) may be associated with a first storage element while another plane (e.g., Plane 1 285) may be associated with a second, different storage element.

In an example, each plane may include one or more blocks and each of the one or more blocks may include one or more pages and/or sub-pages. For example, and depending on the structure of the storage element, each page may include a lower page, a middle page, and upper page, and a top page.

As the number of planes in the storage element 270 increases, the storage element 270 may be able to handle various operations in parallel. For example, the data storage device 220 may be configured to handle independent plane reads. As such, the data storage device 220 may be able to perform simultaneous read operations across different planes without any restrictions regarding the locations of those read operations. In this example, the read operations may be performed in parallel or substantially in parallel. For example, the timing of each read operation across the different planes may need to be aligned.

In another example, the data storage device 220 may be configured to handle asynchronous independent plane reads. In this configuration, the timing of various read operations across the different planes and/or across different storage elements, do not necessarily need to align. Additionally, the pages or sub-pages may be read in any order. For example, for a particular page (or pages) having four different sub-pages (e.g., a lower page, a middle page, and upper page, and a top page), the sub-pages (and/or the pages) may be read in any order (e.g., the middle page may be read first followed by the top page, the lower page and the upper page).

The data storage device 220 may also include a dynamic read threshold (DRT) table 250. The DRT table 250 may store one or more dynamic read table (DRT) entries that may be applied to the various pages of the storage element 270 in response to a failure of a requested read operation. In an example, each DRT entry may include one or more threshold voltages that may be used as part of a read operation. In some examples, the DRT entries are predefined.

In an example, the computing device 210 may submit a read request 230 to the controller 240 of the data storage device 220. Upon receiving the read request 230, the controller 240 determines the physical location of the data associated with the read request 230 in the memory device 260. The controller 240 may also determine, identify or otherwise receive an initial threshold voltage (or voltages) that may be used to determine a charge state of each cell in the storage element 270. For example, in a multi-level cell (MLC) configuration, a particular cell may have four possible charge states (e.g., binary values of 00, 01, 10, and 11). Each read operation may use a set of reference threshold voltages—one for each of the possible charge states.

For example, bits that are above a first read threshold voltage (V1) can be read as having "11" data, bits that are above a second read threshold voltage (V2) but below the first read threshold voltage (V1) can be read as having "10" data, bits that are above a third read threshold voltage (V3) but below the second read threshold voltage (V2) can be read as having "01" data, and bits that are below the third read threshold voltage (V3) can be read as having "00" data. If the charge state is determined, the read operation is successful. In some examples, the initial threshold voltage (or voltages) may be stored in the DRT table 250.

However, in some cases, the read operation associated with the read request 230 may fail. For example, data stored in the storage element 270 may be corrupted, some of the charge associated with a particular block or page may be lost, and/or the controller 240 may be limited in its ability to decode the data.

To compensate for the above, the controller 240 may be configured to access the DRT table 250 and apply different DRT entries across the planes of the storage element 270 in subsequent read operations. In some examples, the DRT entries may be a set of read threshold voltages such as described above.

However, in some examples, the data associated with the read request 230 may not be recoverable. As such, a resulting UECC condition should be reported to the computing device 210. However, before determining and/or reporting the existence of a UECC condition, all of the DRT entries in the DRT table 250 may need to be applied to the various planes of the storage element 270.

In some examples, in response to determining that the read request 230 has failed, the controller 240 may access the DRT table 250 and cause a first DRT entry 290 (e.g., a first threshold voltage or set of threshold voltages) to be applied to the blocks, pages, and/or sub-pages associated with Plane 0 280. In conventional solutions, the same DRT entry (e.g., the first DRT entry290) would also be applied to the blocks, pages, and/or sub-pages of Plane 1 285.

However, application of each DRT entry across the different planes takes time. Additionally, some data storage devices are subject to a timeout condition after a certain amount of time has elapsed (e.g., ~250 ms) without a successful read-retry. Therefore, it would beneficial for a data storage device 220 to quickly determine whether a UECC condition exists.

Thus, and in contrast to reading across all of the planes of the memory die or storage element 270 with the same DRT entry, the controller 240 causes the first DRT entry 290 to be applied across Plane 0 280 and causes a second DRT entry 295 to be applied across Plane 1 285. In such an example, it is presumed that if the first DRT entry 290 fails across Plane 0 280, it will also fail across plane 1 285. Likewise, it is presumed that if the second DRT entry 295 fails across Plane 1 285, it will also fail across Plane 0 280.

If the first DRT entry 290 and the second DRT entry 295 fail, the controller 240 applies additional DRT entries across the different planes of the storage element 270. For example and referring to FIG. 2B, the controller 240 may cause N DRT entry 293 to be applied to Plane 0 280 and cause N+1 DRT entry 297 to be applied across Plane 1 285 of the storage element 270. This process may repeat until all of the DRT entries in the DRT table 250 have been exhausted.

Figure 2B:
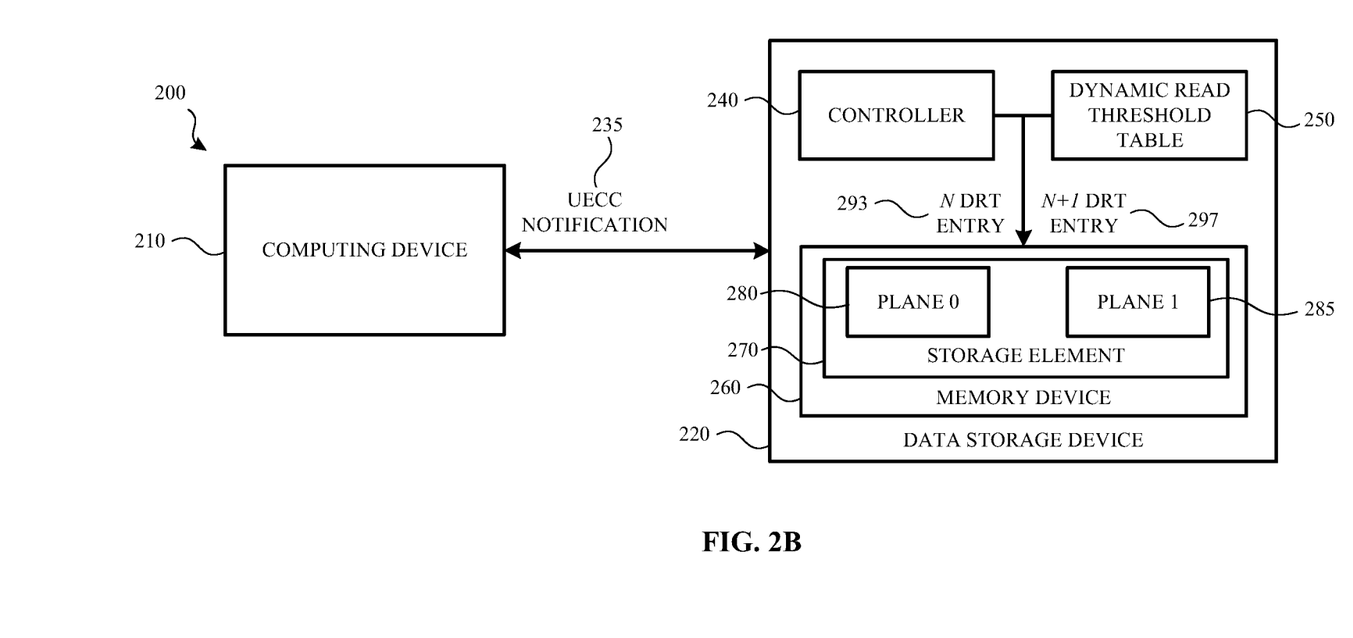
FIG. 2B illustrates how the data storage system of FIG. 2A uses a DRT table to predict a UECC condition of a memory device of the data storage system according to an example.

This type of parallelism will cause the DRT entries in the DRT table 250 to be exhausted in approximately half the time when compared to conventional methods. In the time saved, the controller 240 may cause various background tasks such as, for example, garbage collection, wear-leveling, parity checks to be performed. For example, if the timeout period of a read-retry process is approximately 250 ms, the read-retry process described above may be completed in approximately 125 ms. In the remaining 125 ms, the controller 240 may perform the various background and operations such as described above. In some examples, the various background tasks may be performed on the planes, blocks, pages and/or sub-pages on which the corrupted data resides. In another example, the various background tasks may be performed on any area of the memory device 260.

Once all of the DRT entries in the DRT table 250 have been applied across the various planes of the storage element 270, and presuming none of the DRT entries are successful in reading the data requested by the read request 230, the controller 240 causes a UECC notification 235 to be provided to the computing device 210. In some examples, the UECC notification 235 may be provided to the computing device 210 when all of the DRT entries in the DRT table 250 have been exhausted. In another example, the UECC notification 235 may be provided to the computing device 210 upon (or just before) expiration of a time period associated with a timeout condition.

In an example, each DRT entry may be applied across the different planes of the storage element 270 using the same or similar timing scheme. In another example, the timing of the application of the DRT entries across the different planes may be different.

In some examples, one of the DRT entries that is applied across one of the planes may be successful in enabling the data to be read. For example and referring back to FIG. 2A, the second DRT entry 295 may enable the data stored in Plane 1 285 to be read. In such an example, the controller 240 may cause the second DRT entry 295 to be applied across Plane 0 280. The requested data may then be returned to the computing device 210.

Figure 3A:
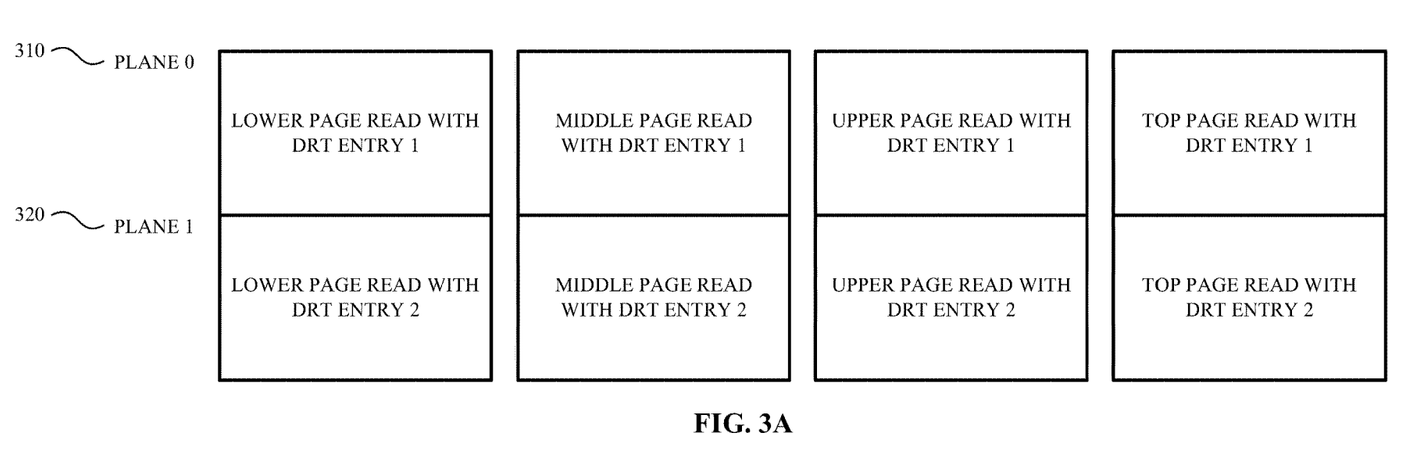
FIG. 3A illustrates how DRT entries of a DRT table are applied to various pages across different planes of a memory device according to an example.

FIG. 3A illustrates how DRT entries of a DRT table are applied to various pages across different planes of a memory device according to an example. For example and as shown in FIG. 3A, a memory device (e.g., memory device 260 (FIG. 2A)), may include one or more storage elements having multiple planes (e.g., Plane 0 310 and Plane 1 320). Each plane may include blocks, pages, and sub-pages such as, for example, a lower page, a middle page, an upper and a top page. Although a lower page, a middle page, an upper page and a top page are specifically shown and described, a plane may have fewer or more sub-pages.

In the example shown in FIG. 3A and in response to a controller (e.g., controller 240 (FIG. 2A)) determining that a read request has failed, the controller may access a DRT table (e.g., DRT table 250 (FIG. 2A)) and cause a first DRT entry (shown as DRT Entry 1) to be applied across Plane 0 310 of the storage element. For example, the first DRT entry may be applied across a lower page, a middle page, an upper page and a top page of one or more blocks of Plane 0 310. Likewise, the controller may cause a second DRT entry (shown as DRT Entry 2) to be applied across Plane 1 320 of the storage element. For example, the second DRT entry may be applied across a lower page, a middle page, an upper page and a top page of one or more blocks of Plane 1 320.

The process may be repeated for every DRT entry in a DRT table until all DRT entries in the DRT table are exhausted and/or until one of the DRT entries is successful in enabling the data to be read. For example and as shown in FIG. 3B, DRT Entry N may be applied across Plane 0 310 and DRT Entry N+1 may be applied across Plane 2 320.

Figure 3B:
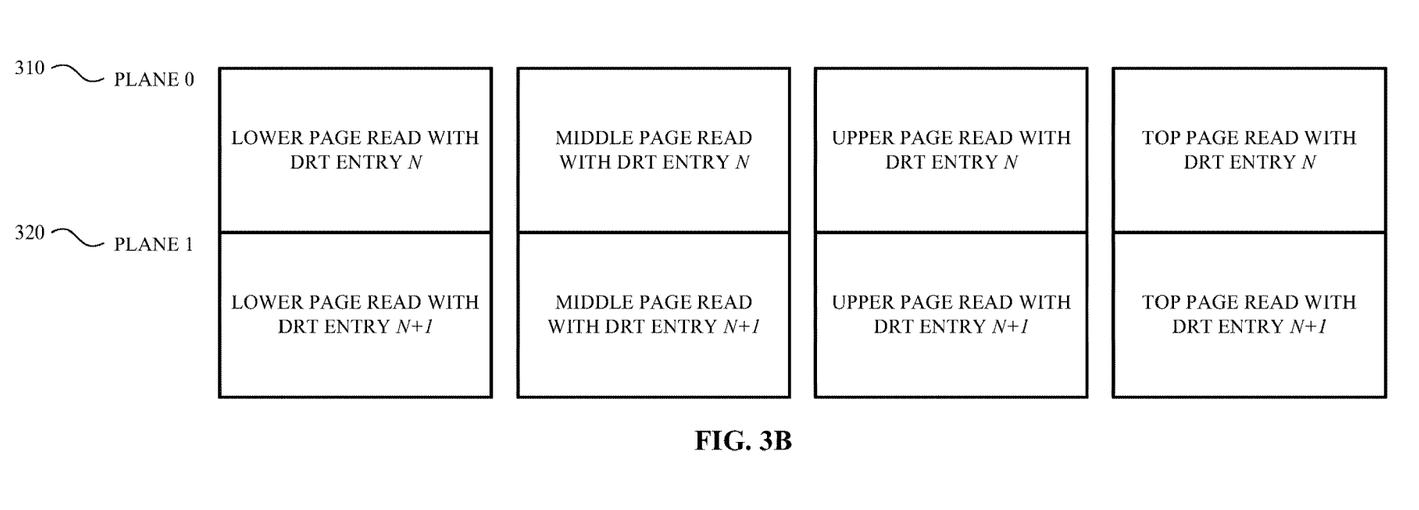
FIG. 3B illustrates how additional DRT entries of the DRT table are applied to the various pages across the different planes of the memory device according to an example.

In FIG. 3A and FIG. 3B, the order and the timing of reading the sub-pages are aligned. For example, DRT Entry 1 is used to read the data associated with the lower page of Plane 0 310 simultaneously or substantially simultaneously when DRT Entry 2 is used to read the data associated with the lower page of Plane 1 320. Likewise, DRT Entry 1 is used to read the data associated with the middle page of Plane 0 310 simultaneously or substantially simultaneously when DRT Entry 2 is used to read the data associated with the middle page of Plane 1 320. However, the aspects of the present disclosure are not so limited.

Figure 4:
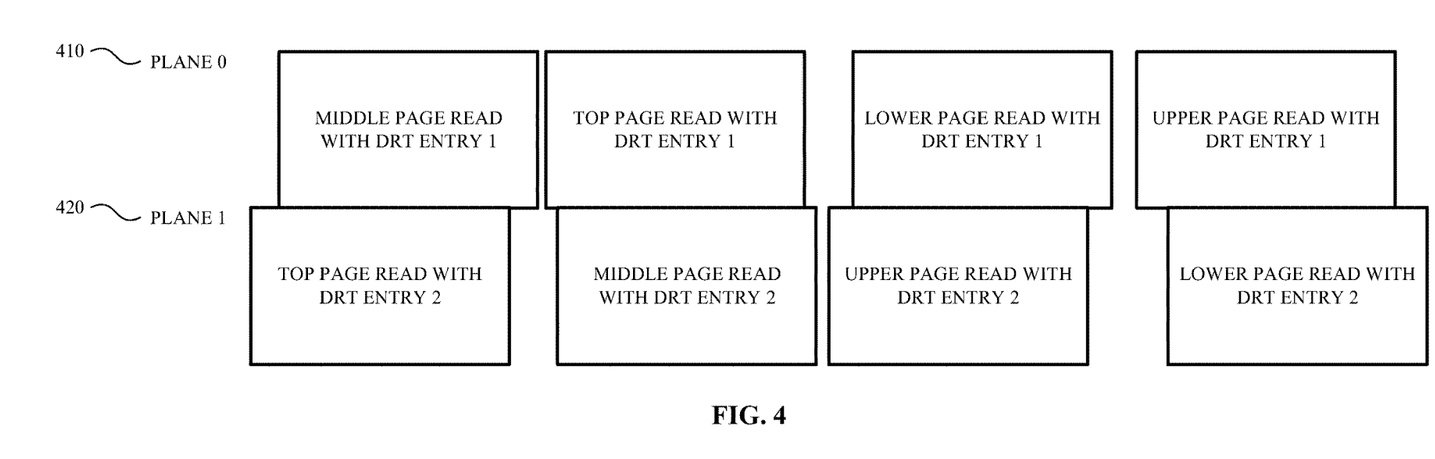
FIG. 4 illustrates how DRT entries of a DRT table are applied to various pages across different planes of a memory device according to another example.

For example and referring to FIG. 4, the data storage system may support asynchronous independent plane reads. In this configuration, the timing of the various read operations across the different planes do not need to align. Additionally, the order in which pages or sub-pages are read may be in any order. Thus, and as shown in FIG. 4, the controller may initiate a read on the top page of Plane 1 420 with DRT entry 2 at a first time, initiate a middle page read with DRT Entry 1 on Plane 0 410 at a second time, initiate a top page read with DRT entry 1 on Plane 0 410 at a third time and initiate a middle page read with DRT entry 2 on plane 420 at a fourth time and so on.

In this example, each of the first time, the second time, the third time and the fourth time are different. Additionally, although FIG. 4 shows a DRT entry applied across a lower page, a middle page, an upper page and a top page of a particular page or block, the example shown and described may be applied across various blocks and/or pages. For example, if the data to be read is stored on multiple pages and/or blocks of Plane 0 410, DRT Entry 1 may be applied across the various blocks, pages and/or sub-pages in any order. Thus, DRT Entry 1 may be applied to a middle page associated with a first page in a first block associated with Plane 0 410, then be applied to a top page associated with a second page in the first block (or a second block) associated with Plane 0 410.

Figure 5:
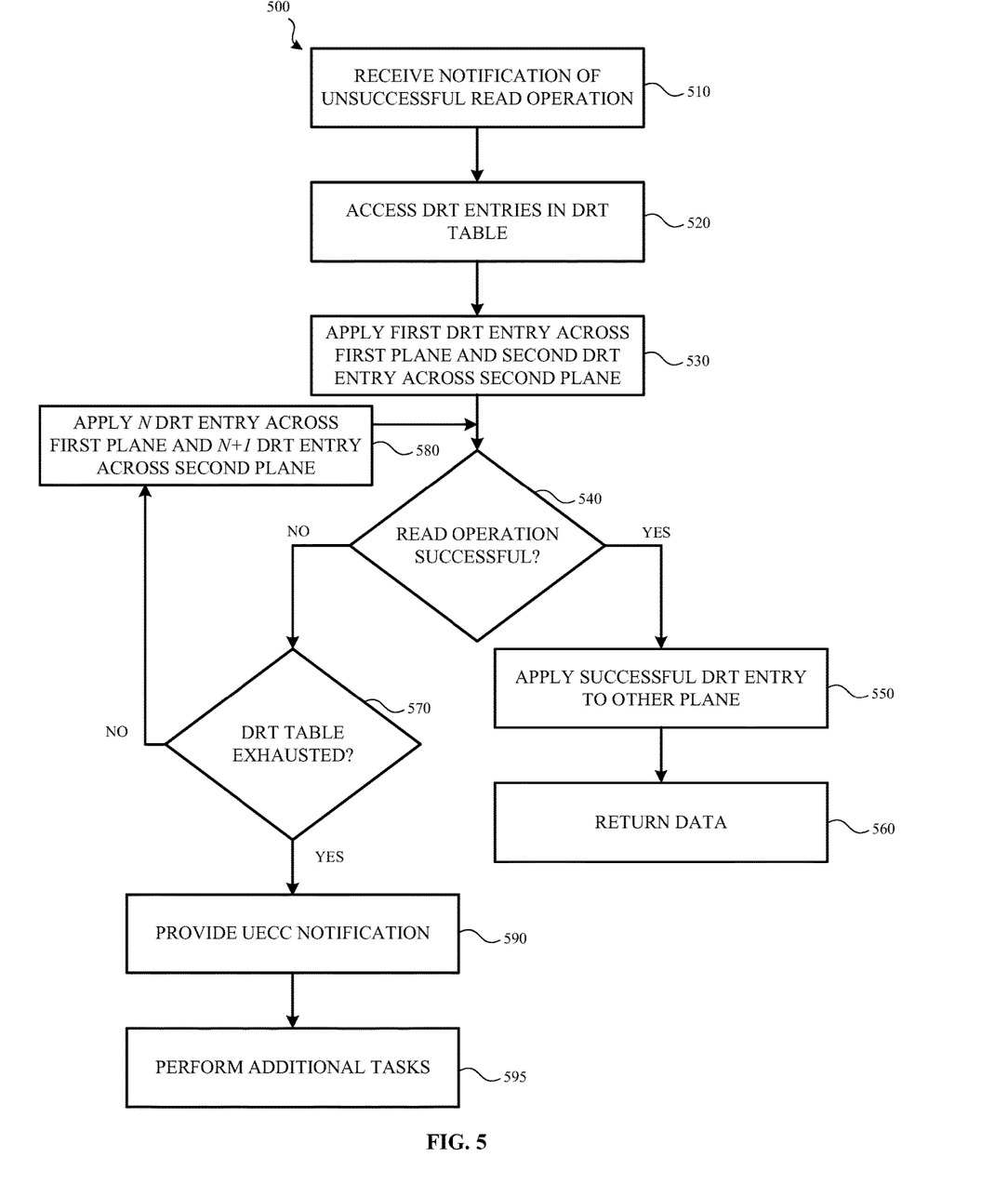
FIG. 5 illustrates a method for applying DRT entries of a DRT table to various planes of a memory device according to an example.

FIG. 5 illustrates a method 500 for applying DRT entries to various planes of a memory device according to an example. The method may be performed by a controller of a data storage device such as, for example, the controller 130 (FIG. 1) and/or the controller 240 (FIG. 2). The method 500 may be used to predict or otherwise determine a UECC condition of a memory device such as described above.

Method 500 begins when a notification of an unsuccessful read operation is received (510). In an example, a host device may provide a read request to a data storage device. The read request may be a request for data that is stored in a particular memory location of a data storage device. A controller of the data storage device may receive a notification that data stored in a particular memory location of the data storage device was not readable using an initial threshold voltage(s). As such, the data cannot be returned.

In response to the notification, the controller may access (520) a DRT table. In an example, the DRT table includes a number of different DRT entries and each DRT entry may include one or more threshold voltages that may be used as part of a read operation. In some examples, the DRT entries are predefined.

Once the DRT table has been accessed, the controller may apply (530) a first DRT entry in the DRT table across a first plane of a storage element of the data storage device on which the requested data is stored and apply a second DRT entry in the DRT table across a second plane of the storage element on which the requested data is stored. For example, first DRT entry may be applied across one or more blocks, pages and/or sub-pages of the first plane of the storage element (or storage elements) and the second DRT entry may be applied across one or more blocks, pages, and/or sub-pages of the second plane of the storage element (or storage elements). In an example, the first DRT entry and the second DRT entry are applied to the respective planes in parallel. In some examples, the timing of each read operation using the various DRT entries on the various blocks, pages and/or sub-pages across the planes may be aligned. In another example, each read operation using the various DRT entries on the various blocks, pages and/or sub-pages across the planes may not need to be aligned.

Once the first DRT entry is applied across the first plane and the second DRT entry is applied across the second plane, a determination is made as to whether one of the read operations were successful (540). For example, a determination is made as to whether the first DRT entry enabled the data stored on the first plane to be read and/or whether the second DRT entry enable the data stored on the second plane to be read.

If it is determined that one of the first DRT entry or the second DRT entry enabled the data to be read on its respective plane, the controller applies (550) the successful DRT entry to the other plane. For example, if the first DRT entry was successful in reading the data stored on or otherwise associated with the first plane, the first DRT entry is then applied to the data stored on or otherwise associated with the second plane. Once this is complete, the controller may return (560) the requested data to the host device.

In an example, it is presumed that if the first DRT entry fails across the first plane, it will also fail across the second plane. Likewise, it is presumed that if the second DRT entry fails across the second plane, it will also fail across the first plane. This may be due to the fact that data across the different planes were initially written in a similar manner and/or the physical blocks associated with each plane are uniform or substantially uniform. Accordingly, the controller may access the DRT table and apply additional DRT entries to the different planes of the storage element.

For example, the controller may determine (570) whether the DRT table is exhausted (e.g., whether all of the DRT entries in the DRT table have been applied across the various planes of the storage element). If the DRT table is not exhausted, the controller applies (580) NDRT entry across the first plane and N+1 DRT entry across the second plane and the process repeats.

However, if it is determined (570) that the DRT table has been exhausted, the controller may provide (590) a UECC notification to the host device. Additionally, the controller may cause various background tasks such as, for example, garbage collection, wear-leveling, parity checks to be performed (595) during any time saved by the parallel application of the DRT entries such as described above.

Accordingly, aspects of the present disclosure describe a method, comprising: receiving an indication that a read operation, requested by a host device, has failed, the read operation requesting data stored by a data storage device; based on receiving the indication, accessing a dynamic read threshold table, the dynamic read threshold table storing a plurality of dynamic read threshold entries for reading the data stored by the data storage device; applying a first dynamic read threshold entry of the plurality of dynamic read threshold entries to each page associated with a memory block on a first plane of a memory die associated with the data storage device; applying a second dynamic read threshold entry of the plurality of dynamic read threshold entries to each page associated with a memory block on a second plane of the memory die associated with the data storage device; and determining whether at least one of the first dynamic read threshold entry of the plurality of dynamic read threshold entries and the second dynamic read threshold entry of the plurality of dynamic read threshold entries is successful in reading the data associated with the read operation.

The present disclosure also describes applying the first dynamic read threshold entry of the plurality of dynamic read threshold entries to each page associated with the memory block of the second plane of the memory die based, at least in part, on determining the first dynamic read threshold entry of the plurality of dynamic read threshold entries was successful in reading the data associated with the read operation. The present disclosure also describes based on determining that the first dynamic read threshold entry of the plurality of dynamic read threshold entries and the second dynamic read threshold entry of the plurality of dynamic read threshold entries are unsuccessful in reading the data associated with the read operation: applying a third dynamic read threshold entry of the plurality of dynamic read threshold entries to each page associated with the memory block on the first plane of the memory die; and applying a fourth dynamic read threshold entry of the plurality of dynamic read threshold entries to each page associated with the memory block on the second plane of the memory die. The present disclosure also describes determining whether at least one of the third dynamic read threshold entry of the plurality of dynamic read threshold entries and the fourth dynamic read threshold entry of the plurality of dynamic read threshold entries is successful in reading the data associated with the read operation. The present disclosure also describes providing an unsuccessful error correction code notification to the host device based, at least in part, on determining the third dynamic read threshold entry of the plurality of dynamic read threshold entries and the fourth dynamic read threshold entry of the plurality of dynamic read threshold entries are unsuccessful in reading the data associated with the read operation. The present disclosure also describes that the first dynamic read threshold entry of the plurality of dynamic read threshold entries is applied to each page associated with the memory block on the first plane of the memory die in an order and in a time frame that is independent from an order and a time frame in which the second dynamic read threshold entry of the plurality of dynamic read threshold entries is applied to each page associated with the memory block on the second plane of the memory die. The present disclosure also describes that the second dynamic read threshold entry of the plurality of dynamic read threshold entries is applied to each page associated with the memory block on the second plane of the memory die and the first dynamic read threshold entry of the plurality of dynamic read threshold entries is applied to each page associated with the memory block on the first plane of the memory die in parallel.

The present disclosure also describes a data storage device, comprising: a controller; and a memory communicatively coupled to the controller and storing instructions that, when executed by the controller, perform operations, comprising: determining that a read operation requesting data stored by the data storage device is unsuccessful; and based on determining that the requested read operation is unsuccessful: applying a first dynamic read threshold entry associated with a dynamic read threshold table across a first plane of a memory die of the data storage device on which the data is stored; applying a second dynamic read threshold entry associated with the dynamic read threshold table across a second plane of the memory die of the data storage device on which the data is stored; and determining whether at least one of the first dynamic read threshold entry and the second dynamic read threshold entry is successful in reading the data associated with the read operation.

The data storage device also includes instructions for applying the first dynamic read threshold entry across the second plane of the memory die of the data storage device based, at least in part, on determining the first dynamic read threshold entry was successful in reading the data associated with the read operation. The data storage device also includes instructions for applying a third dynamic read threshold entry associated with the dynamic read threshold table across the first plane of the memory die and applying a fourth dynamic read threshold entry associated with the dynamic read threshold table across the second plane of the memory die based, at least in part, on determining that the first dynamic read threshold entry and the second dynamic read threshold entry are unsuccessful in reading the data associated with the read operation. The data storage device also includes instructions for determining whether at least one of the third dynamic read threshold entry and the fourth dynamic read threshold entry is successful in reading the data associated with the read operation. The data storage device also includes instructions for providing an unsuccessful error correction code notification to a host device based, at least in part, on determining the third dynamic read threshold entry and the fourth dynamic read threshold entry are unsuccessful in reading the data associated with the read operation. The present disclosure also describes that the first dynamic read threshold entry is applied across the first plane of the data storage device in an order that is independent from an order in which the second dynamic read threshold entry is applied across the second plane of the data storage device. The present disclosure also describes that the second dynamic read threshold entry is applied across the second plane of the memory die and the first dynamic read threshold entry is applied across the first plane of the memory die in parallel. The present disclosure also describes that the first and second planes are located in different memory dies.

The present application also describes a data storage device, comprising: a non-volatile storage device comprising a plurality of memory dies, each memory die of the plurality of memory dies having a first plane and a second plane; means for determining that a requested read operation associated with at least one memory die of the plurality of memory dies is unsuccessful; and based on determining that the requested read operation is unsuccessful: means for applying a first dynamic read threshold entry associated with a dynamic read threshold table across the first plane of the at least one memory die; means for applying a second dynamic read threshold entry associated with the dynamic read threshold table across the second plane of the at least one memory die; and means for determining whether at least one of the first dynamic read threshold entry and the second dynamic read threshold entry is successful in reading data requested by the read operation and stored by the at least one memory die.

The data storage device also includes means for applying the first dynamic read threshold entry across the second plane of the at least one memory die based, at least in part, on determining the first dynamic read threshold entry was successful in reading the data requested by the read operation. The data storage device also includes means for applying a third dynamic read threshold entry across the first plane of the memory die and means for applying a fourth dynamic read threshold entry across the second plane of the memory die based on determining that the first dynamic read threshold entry and the second dynamic read threshold entry are unsuccessful in reading the data associated with the read operation; and means for determining whether at least one of the third dynamic read threshold entry and the fourth dynamic read threshold entry is successful in reading the data associated with the read operation. The data storage device also includes means for providing an unsuccessful error correction code notification to a host device based, at least in part, on determining the third dynamic read threshold entry and the fourth dynamic read threshold entry are unsuccessful in reading the data associated with the read operation. The data storage device also includes means for determining an amount of time remaining between when the error correction code notification is provided to the host device and when a timeout condition associated with the requested read operation is satisfied; and means for performing additional operations during the amount of time.

The description and illustration of one or more aspects provided in the present disclosure are not intended to limit or restrict the scope of the disclosure in any way. The aspects, examples, and details provided in this disclosure are considered sufficient to convey possession and enable others to make and use the best mode of claimed disclosure.

The claimed disclosure should not be construed as being limited to any aspect, example, or detail provided in this disclosure. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

References to an element herein using a designation such as "first," "second," and so forth does not generally limit the quantity or order of those elements. Rather, these designations may be used as a method of distinguishing between two or more elements or instances of an element. Thus, reference to first and second elements does not mean that only two elements may be used or that the first element precedes the second element. Additionally, unless otherwise stated, a set of elements may include one or more elements.

Terminology in the form of "at least one of A, B, or C" or "A, B, C, or any combination thereof" used in the description or the claims means "A or B or C or any combination of these elements." For example, this terminology may include A, or B, or C, or A and B, or A and C, or A and B and C, or 2A, or 2B, or 2C, or 2A and B, and so on. As an additional example, "at least one of: A, B, or C" is intended to cover A, B, C, A-B, A-C, B-C, and A-B-C, as well as multiples of the same members. Likewise, "at least one of: A, B, and C" is intended to cover A, B, C, A-B, A-C, B-C, and A-B-C, as well as multiples of the same members.

Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

What is claimed is:

1. A method, comprising:
receiving an indication that a read operation, requested by a host device, has failed, the read operation requesting data stored by a data storage device;
based on receiving the indication, accessing a dynamic read threshold table, the dynamic read threshold table storing a plurality of dynamic read threshold entries for reading the data stored by the data storage device;
applying a first dynamic read threshold entry of the plurality of dynamic read threshold entries to each page associated with a memory block on a first plane of a memory die associated with the data storage device;
simultaneously applying a second dynamic read threshold entry of the plurality of dynamic read threshold entries to each page associated with a memory block on a second plane of the memory die associated with the data storage device, the second plane being different than the first plane; and
determining whether at least one of the first dynamic read threshold entry of the plurality of dynamic read threshold entries and the second dynamic read threshold entry of the plurality of dynamic read threshold entries is successful in reading the data associated with the read operation.

2. The method of claim 1, further comprising applying the first dynamic read threshold entry of the plurality of dynamic read threshold entries to each page associated with the memory block of the second plane of the memory die based, at least in part, on determining the first dynamic read threshold entry of the plurality of dynamic read threshold entries was successful in reading the data associated with the read operation.

3. The method of claim 1, further comprising:
based on determining that the first dynamic read threshold entry of the plurality of dynamic read threshold entries and the second dynamic read threshold entry of the plurality of dynamic read threshold entries are unsuccessful in reading the data associated with the read operation:
applying a third dynamic read threshold entry of the plurality of dynamic read threshold entries to each page associated with the memory block on the first plane of the memory die; and
simultaneously applying a fourth dynamic read threshold entry of the plurality of dynamic read threshold entries to each page associated with the memory block on the second plane of the memory die.

4. The method of claim 3, further comprising determining whether at least one of the third dynamic read threshold entry of the plurality of dynamic read threshold entries and the fourth dynamic read threshold entry of the plurality of dynamic read threshold entries is successful in reading the data associated with the read operation.

5. The method of claim 4, further comprising providing an unsuccessful error correction code notification to the host device based, at least in part, on determining the third dynamic read threshold entry of the plurality of dynamic read threshold entries and the fourth dynamic read threshold entry of the plurality of dynamic read threshold entries are unsuccessful in reading the data associated with the read operation.

6. The method of claim 1, wherein the first dynamic read threshold entry of the plurality of dynamic read threshold entries is applied to each page associated with the memory block on the first plane of the memory die in an order and in a time frame that is independent from an order and a time frame in which the second dynamic read threshold entry of the plurality of dynamic read threshold entries is applied to each page associated with the memory block on the second plane of the memory die.

7. The method of claim 1, wherein the first plane is associated with a first memory die and the second plane is associated with a second memory die.

8. A data storage device, comprising:
a controller operable to:
determine that a read operation requesting data stored by the data storage device is unsuccessful; and
based on a determination that the requested read operation is unsuccessful:
apply a first dynamic read threshold entry associated with a dynamic read threshold table across a first plane of a memory die of the data storage device on which the data is stored;
simultaneously apply a second dynamic read threshold entry associated with the dynamic read threshold table across a second plane of the memory die of the data storage device on which the data is stored, the second plane being different than the first plane; and
determine whether at least one of the first dynamic read threshold entry and the second dynamic read threshold entry is successful in reading the data associated with the read operation.

9. The data storage device of claim 8, further comprising instructions for applying the first dynamic read threshold entry across the second plane of the memory die of the data storage device based, at least in part, on determining the first dynamic read threshold entry was successful in reading the data associated with the read operation.

10. The data storage device of claim 8, further comprising instructions for applying a third dynamic read threshold entry associated with the dynamic read threshold table across the first plane of the memory die and simultaneously applying a fourth dynamic read threshold entry associated with the dynamic read threshold table across the second plane of the memory die based, at least in part, on determining that the first dynamic read threshold entry and the second dynamic read threshold entry are unsuccessful in reading the data associated with the read operation.

11. The data storage device of claim 10, further comprising instructions for determining whether at least one of the third dynamic read threshold entry and the fourth dynamic read threshold entry is successful in reading the data associated with the read operation.

12. The data storage device of claim 11, further comprising instructions for providing an unsuccessful error correction code notification to a host device based, at least in part, on determining the third dynamic read threshold entry and the fourth dynamic read threshold entry are unsuccessful in reading the data associated with the read operation.

13. The data storage device of claim 8, wherein the first dynamic read threshold entry is applied across the first plane of the data storage device in an order that is independent from an order in which the second dynamic read threshold entry is applied across the second plane of the data storage device.

14. The data storage device of claim 8, wherein the first and second planes are located in different memory dies.

15. A data storage device, comprising:
a non-volatile storage device comprising a plurality of memory dies, each memory die of the plurality of memory dies having a first plane and a second plane;
means for determining that a requested read operation associated with at least one memory die of the plurality of memory dies is unsuccessful; and
based on determining that the requested read operation is unsuccessful:
means for applying a first dynamic read threshold entry associated with a dynamic read threshold table across the first plane of the at least one memory die of the plurality of memory dies;
means for applying a second dynamic read threshold entry associated with the dynamic read threshold table across the second plane of at least one memory die of the plurality of memory dies, wherein the second plane is different than the first plane and wherein the second dynamic read threshold entry is applied simultaneously with the first dynamic read threshold entry; and
means for determining whether at least one of the first dynamic read threshold entry and the second dynamic read threshold entry is successful in reading data requested by the read operation and stored by the at least one memory die.

16. The data storage device of claim 15, further comprising means for applying the first dynamic read threshold entry across the second plane of the at least one memory die based, at least in part, on determining the first dynamic read threshold entry was successful in reading the data requested by the read operation.

17. The data storage device of claim 15, further comprising:
means for applying a third dynamic read threshold entry across the first plane of the memory die and means for simultaneously applying a fourth dynamic read threshold entry across the second plane of the memory die based, at least in part, on determining that the first dynamic read threshold entry and the second dynamic read threshold entry are unsuccessful in reading the data associated with the read operation; and
means for determining whether at least one of the third dynamic read threshold entry and the fourth dynamic read threshold entry is successful in reading the data associated with the read operation.

18. The data storage device of claim 17, further comprising means for providing an unsuccessful error correction code notification to a host device based, at least in part, on determining the third dynamic read threshold entry and the fourth dynamic read threshold entry are unsuccessful in reading the data associated with the read operation.

19. The data storage device of claim 18, further comprising:
means for determining an amount of time remaining between when the error correction code notification is provided to the host device and when a timeout condition associated with the requested read operation is satisfied; and
means for performing additional operations during the amount of time.

20. The data storage device of claim 15, wherein the first plane is associated with a first memory die and the second plane is associated with a second memory die.

* * * * *